(12) United States Patent
Hall

(10) Patent No.: US 6,219,545 B1
(45) Date of Patent: Apr. 17, 2001

(54) TELECOMMUNICATIONS SYSTEM AND A CORDLESS ACCESS SUBSYSTEM

(75) Inventor: Lawrence M. Hall, Hilversum (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/819,901

(22) Filed: Mar. 18, 1997

(30) Foreign Application Priority Data

Apr. 4, 1996 (EP) .................................................. 96200929

(51) Int. Cl.[7] .................................................. H04Q 7/20
(52) U.S. Cl. ........................................... 455/426; 455/552
(58) Field of Search .................................. 455/432, 554, 455/555, 414, 435, 433, 442, 426, 552, 461; 379/60

(56) References Cited

U.S. PATENT DOCUMENTS

| | | | |
|---|---|---|---|
| 4,850,036 | * 7/1989 | Smith ..................................... | 455/179 |
| 5,353,331 | * 10/1994 | Emery et al. ........................... | 455/461 |
| 5,394,433 | * 2/1995 | Bantz et al. ............................ | 375/202 |
| 5,418,838 | * 5/1995 | Havermans et al. .................... | 379/60 |
| 5,461,669 | * 10/1995 | Vilain ..................................... | 379/350 |
| 5,521,963 | * 5/1996 | Shrader et al. ......................... | 379/60 |
| 5,535,198 | * 7/1996 | Baker et al. ............................ | 370/60 |
| 6,055,430 | * 4/2000 | Cooper et al. ......................... | 455/445 |
| 6,112,078 | * 8/2000 | Sormunen et al. .................... | 455/411 |
| 6,150,955 | * 11/2000 | Tracy et al. ........................ | 340/870.02 |

OTHER PUBLICATIONS

"The Open Book—A Practical Perspective on OSI" Marshall T. Rose, Prentice Hall 1990, pp. 19–48, 61–73, 85–97 and 125–131.

* cited by examiner

Primary Examiner—William G. Trost
Assistant Examiner—Sheila Smith
(74) Attorney, Agent, or Firm—Jack D. Slobod

(57) ABSTRACT

In order that roaming cordless terminals in a telecommunications system have access possibilities in accordance to their subscription, the telecommunications system has a call control protocol in which calls can be set up according to various scenarios, depending upon subscription. When an automatic branch exchange to which the cordless terminal is locked via a cordless access subsystem is coupled to another automatic branch exchange via an intervening network and the cordless terminal's home profile is in the other automatic branch exchange, a remote scenario can be carried out for allowing the cordless terminal to have access to all the features of its home profile. So, cordless terminals having different subscriptions can be dealt with in different ways. Processing of call control messages at the side of the cordless access subsystem can be made simpler when the cordless access subsystem sends a call control setup message to the rest of the network in the form of a single message containing terminal identification information and user provided information.

12 Claims, 2 Drawing Sheets

TELECOMMUNICATIONS SYSTEM AND A CORDLESS ACCESS SUBSYSTEM

BACKGROUND OF THE INVENTION

1. Field of the Invention

The present invention relates to a telecommunications system comprising at least one cordless access subsystem, a cordless terminal, and a network of at least one automatic branch exchange, the system having call control means.

The present invention further relates to a cordless access subsystem for use in such a telecommunications system.

2. Description of the Related Art

A telecommunications system of this kind is known from the U.S. Pat. No. 5,418,838. The known system is comprised of a private automatic branch exchange having a cordless access subsystem. The branch exchange may be coupled to a public switched telecommunications network. A number of automatic branch exchanges may be coupled to form a network. The cordless access subsystem comprises a number of radio base stations or as called in a DECT (Digital European Cordless Telecommunications) system, radio fixed parts, clusters of which are coupled to each other via a backbone network in the branch exchange. In the known system, which is a microcellular cordless telephony system, for instance, the cordless terminal is allowed to roam locally. Handover of calls is done via the local backbone network. In other known systems, such as in GSM (Global System for Mobile Telecommunications), a mobile radio terminal is allowed to roam over a large geographical area. In GSM, the so-called Home/Visitor concept is applied in which at all registration locations the same standardised set of features is offered.

OBJECTS AND SUMMARY OF THE INVENTION

It is an object of the present invention to provide a telecommunications system in which a cordless terminal can always have access to all the network features it has the right to access from its subscription even though not all exchanges implement all network features.

To this end the telecommunications system is characterised in that the call control means comprise a call control agent at the side of the cordless access subsystem and a call control manager at the side of the network, whereby the call control agent is arranged to operate a call control protocol in which a call control setup message for an outgoing call from the cordless terminal is sent to a call control manager transport entity by a call control agent transport entity, which call control setup message comprises an information element indicating to the network the call control scenario to be carried out depending on the cordless terminal subscription. Herewith, call control can be done locally or remotely, depending on subscription.

In an embodiment of a telecommunications system according to the present invention, the information element comprises a globally unique operation value to be interpreted by the call control manager so as to accept or reject the call control setup message even if there is no call control manager transport entity, and operation parameters to be processed by the call control manager when it has not rejected an operation value. This makes it possible to attach cordless access subsystems operating according to the present invention to standard networks.

In an embodiment of a telecommunications system according to the present invention, the network is an ISDN network and the call control setup scenarios are local standard ISDN, local enhanced ISDN, and remote enhanced ISDN. In ISDN a lot of features are already standardized so that a varying package of features can easily be offered.

In an embodiment of a telecommunications system according to the present invention, when the scenario is remote enhanced ISDN, wherein the network comprises at least one further automatic branch exchange, the branch exchanges are coupled to each other at remote locations by means of an intervening network, the further branch exchange is a home branch exchange for the cordless terminal locked to the other branch exchange, and the call control manager is located in the further branch exchange so as to control the call from the remote cordless terminal. Present branch exchanges can cooperate with many different types of networks. So, for making the cordless access subsystems suitable for a different intervening network, only relative simple software has to be added thereto.

In an embodiment of a telecommunications system according to the present invention, the call control setup message further comprises a unique cordless terminal identification number from which the network derives routing of the call control setup message to the home branch exchange. Herewith, the network can find the right call control manager.

In an embodiment of a telecommunications system according to the present invention, the call control setup message comprises subscriber provided information including a call destination number and wherein the network temporarily stores the subscriber provided information, first sends the terminal identification number to the home branch exchange, and then, after having received acknowledgement from the home branch exchange that the cordless terminal is known in the home branch exchange, sends the stored subscriber provided information to the home branch exchange. Herewith, the interface between the cordless access subsystem is simpler because only a single acknowledgement is needed and reduced processing effort in the cordless access subsystem is needed.

In an embodiment of a telecommunications system according to the present invention, the call control setup message comprises subscriber provided information including a call destination number and wherein the network immediately sends the terminal identification number and the subscriber provided information to the home branch exchange. Herewith, the interface between the cordless access subsystem is simpler because only a single acknowledgement is needed and reduced processing effort in the network is needed.

BRIEF DESCRIPTION OF THE DRAWINGS

The present invention will now be described, by way of example, with reference to the accompanying drawings, wherein FIG. 1 schematically shows a telecommunications system according to the invention.

Throughout the figures the same reference numerals are used for the same features.

DETAILED DESCRIPTION OF THE PREFERRED EMBODIMENT

Figure 1:
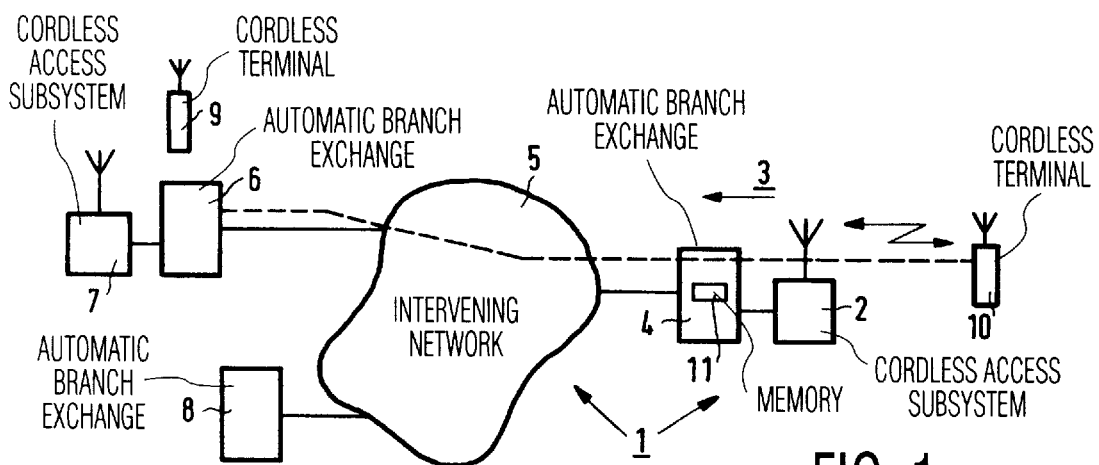

FIG. 1 schematically shows a telecommunications system 1 according to the invention comprising a cordless access subsystem 2 coupled to a network 3 comprised of an automatic branch exchange 4, an intervening network 5, a further automatic branch exchange 6 coupled to a further cordless access subsystem 7, and a still further automatic branch exchange 8. The intervening network 5 can have any structure. The intervening network 5 can be any suitable network, all well-known in the art. Such a telecommunications system 1 typically is a wide area cordless telephone system of private automatic branch exchanges coupled to a public network such as an ISDN (Integrated Services Digital Network). In the example given, ISDN is taken as an example but the invention is not limited to this example. For describing signalling in the telecommunications system, ISDN terminology is used such as can be found in the CCITT Blue Books, Geneva 1989, Volume III-Fascicle III.8, ISDN Recommendations I.310–I.470, Volume VI-Fascicle VI. 10, ISDN Recommendations Q.920–Q.921, "Signalling System DSS1—Data Link Layer", and Volume VI-Fascicle VI.11, ISDN Recommendations Q.930–Q.940, "Signalling System DSS1—Network Layer". Furthermore, the invention is described in protocol terminology as used with respect to the so-called OSI (Open Systems Interconnection) Reference Model, well-known in the art. Referred is to the handbook, "The Open Book—A Practical Perspective on OSI", M. T. Rose, Prentice Hall 1990, in particular pp. 19–48, pp. 61–73, pp. 85–97, and pp. 125–131. Further shown in the system 1 are cordless terminals 9 and 10. The cordless terminals in the telecommunications system 1 may have various roaming possibilities, depending on subscription. E.g. the cordless terminal 10 may be restricted to make local calls only, may make long-distance calls, may have a limited set of features or may have a more extended set of features. In an example, the cordless terminal 10 is visiting the automatic branch exchange 4 whereas its full subscriber's profile is only available in the home data base of its remote home automatic branch exchange 6. The invention then provides for the subscriber of the cordless terminal to have access to all the facilities it is subscribed to at its home automatic branch exchange 6 when locking onto the cordless access subsystem 2 that is coupled to the visited automatic branch exchange 4. With a dashed line, routing through the intervening network 5 from the cordless terminal 10 to its home automatic branch exchange 6 is indicated. It is to be realized that another cordless terminal may have another home automatic branch exchange, and further that not all automatic branch exchanges will have to provide the same set of facilities. The automatic branch exchanges may also be of a different type or may come from different manufacturers. The cordless access subsystem 2 preferably is a so-called DECT access system, as described in said U.S. Pat. No. 5,418,838. The automatic branch exchange 4 comprises a memory 11.

Figure 2:
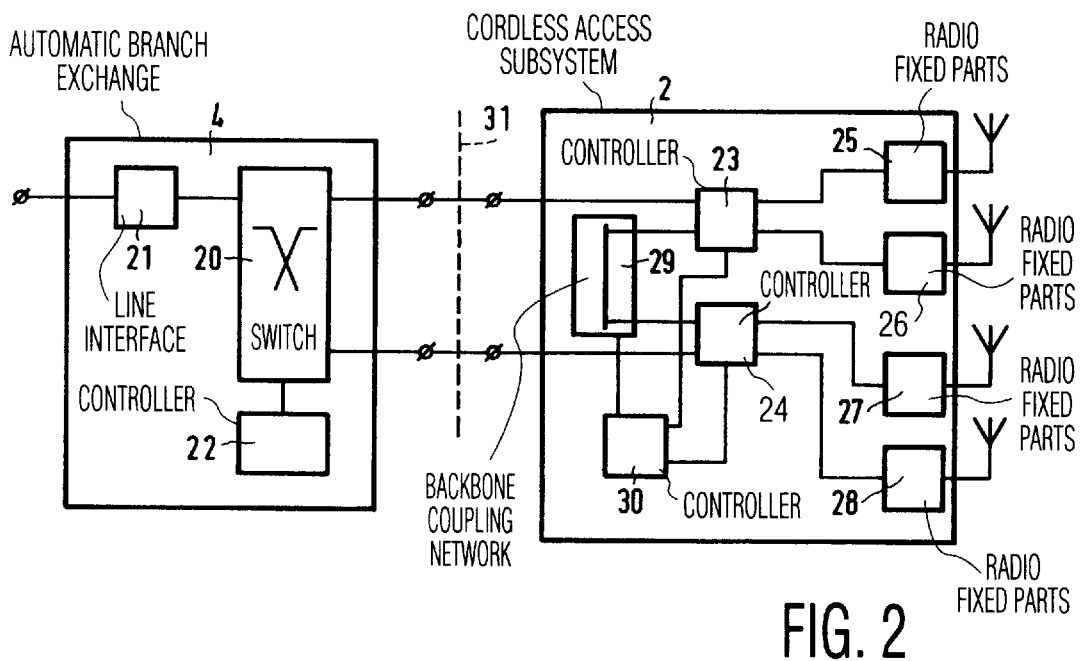
FIG. 2 shows an automatic branch exchange coupled to a cordless access subsystem for a telecommunications system according to the invention.

FIG. 2 shows the automatic branch exchange 4 coupled to the cordless access subsystem 2 for the telecommunications system 1 according to the invention. The automatic branch exchange 4 comprises a switch 20 coupled to a line interface 21 and to a controller 22 containing a processor, a memory for programs and fixed data, and a memory for variable data (not shown in detail). The cordless access subsystem 2 comprises cluster controllers 23 and 24 for controlling respective clusters of radio fixed parts 25 and 26, and 27 and 28 comprising antennas for radio communication with cordless terminals. For allowing local roaming of cordless terminals, the cordless access subsystem 2 further comprises a backbone coupling network 29 for fast handovers. The cordless access subsystem 2 further comprises a controller 30 for overall control of the subsystem and for carrying out protocols over a network interface 31. The present invention is concerning protocols over the network interface 31.

Figure 3:
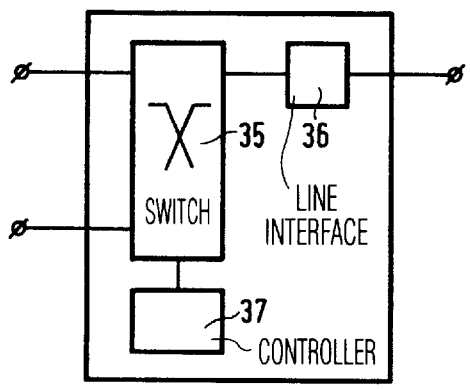
FIG. 3 shows a further automatic branch exchange for a telecommunications system according to the invention.

FIG. 3 shows the further automatic branch exchange 6 for the telecommunications system 1 according to the invention. The automatic branch exchange 6 comprises a switch 35 coupled to a line interface 36, and to a controller 37. The line interface 36 is coupled to the intervening network 5.

Figure 4:
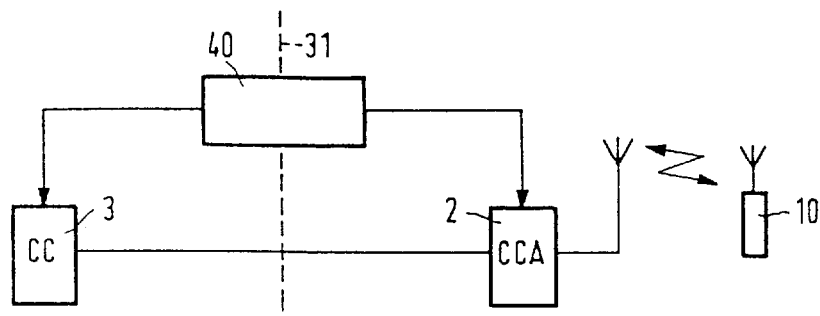
FIG. 4 shows call control according to the invention.

FIG. 4 shows call control means 40 according to the invention from a logical point of view that may be distributed over the network. Call control is done between the cordless access subsystem 2 and the remaining part of the network 3 via the interface 31. In this respect a call control agent CCA is present in the software of the cordless access subsystem 2 and a call control manager is present in the software of the network 3. In OSI terminology, an agent is a service to a user, in the present case to the Application Layer. For a local cordless access subsystem, the call control protocol is in the Network Layer, but with the intervening network 5 with exchanges in between, the same call control protocol is in the Application Layer for the cordless access system 2 as remote to the home automatic branch exchange 6. The intervening network 5 perceives the call control protocol as being in the Application Layer, but the cordless terminal 10 still perceives the call control protocol in the Network Layer. So, the Application Layer Protocol has to be carried over the Transport Layer (in terms of OSI) via peer to peer transport entities. In the example where the automatic branch exchange 6 stores the profile of the cordless terminal 6 the call control manager CC is remote from the network side directly at the interface 31. According to the invention, the call control protocol permits at least three different scenarios, namely local standard ISDN signalling, local enhanced ISDN signalling, and remote enhanced ISDN signalling.

Figure 5:
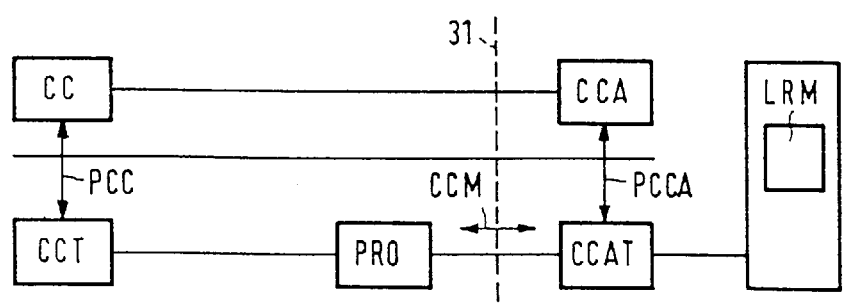
FIG. 5 shows OSI-layer entities for illustrating the operation of the invention.

FIG. 5 shows OSI-layer entities for illustrating the operation of the invention. Shown are functional application layer entities, the call control manager CC and the call control agent CCA, and functional transport layer entities, a call control transport manager entity, a call control agent entity CCAT, and a so-called proxy PRO. The proxy PRO is an entity directly on the network side of the interface 31. According to the invention, a call control setup message CCM is exchanged between the cordless subsystem transport layer entity CCAT and the network transport layer entity PRO. Via service access points, connection oriented and/or connection-less primitives PCCA and PCC are exchanged between the application layer and the transport layer of the call control manager and the call control agent. In an embodiment, the call control application layer protocol can pass across a DSS1 interface as defined in said CCITT Blue Book Volume VI-Fascicle VI.11, ISDN Recommendations Q.930–Q.940, "Signalling System DSS1—Network Layer". The functional protocol as defined in ETS 300 196 is used.

Figure 6:
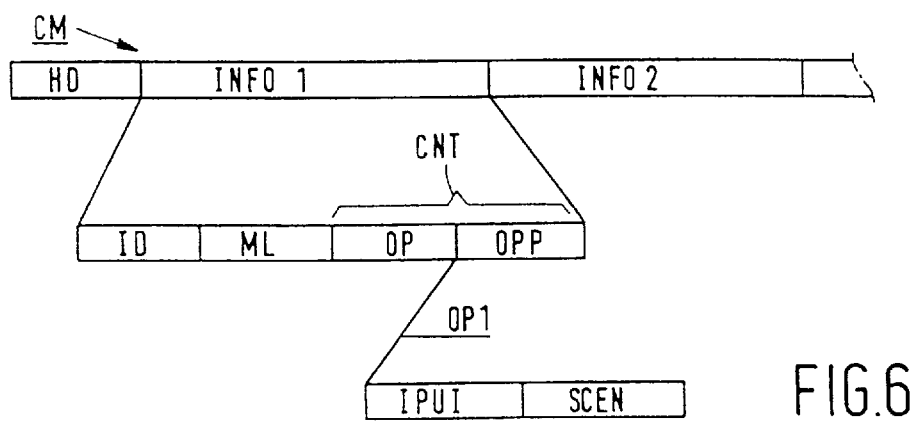
FIG. 6 shows a call control setup message according to the invention.

FIG. 6 shows the call control setup message CCM according to the invention to be transported over the transport layer service message interface between the call control agent transport entity and the proxy PRO. For public ISDN, normal call control messages as defined in ETS 300 102 are used, and for private ISDN, the messages as defined in ETS 300 192. The call control setup message CMM comprises a header HD, followed by information elements INFO1, INFO2, . . . The information element INFO1 comprises a identity field ID, and a message length ML followed by a content CNT. In ETS 300 196 a mechanism is described how to put additional information into a message as defined in ETS 300 102 or ETS 300 192, namely to define a specific information element as a facility information element. The facility information element partly defines the content CNT. The content CNT must contain an operation OP. The operation OP is followed by operation parameters OPP as defined by the operation OP. The operation OP is represented by a globally unique value. In this respect one manufacturer of a PABX and its OEMs use a different operation value as an object identifier than another manufacturer. The receiver of a setup message CM can analyse the setup message CMM determining which information elements are standard according to ETS 300 102 or ETS 300 192, and which if any are facility information elements according to ETS 300 196. For each facility information element it can use the operation value OP to determine whether or not it understands the content of the information element. According to this invention, when a cordless access subsystem 2 needs to setup a call on request from the terminal 10 it sends the setup message CM to the remaining part of the network 3 with:

if the scenario is local standard ISDN, no facility information element;
  if the scenario is local enhanced ISDN or remote enhanced ISDN, a facility information element with a predetermined operation value OP1 and with parameters specifying an International Portable User Identity IPUI and a scenario SCEN. In the network 3 the proxy PRO processes the setup message CM and if the facility info element is present, the proxy PRO processes the scenario field SCEN. If the scenario is local enhanced ISDN signalling is done. If the scenario is remote enhanced ISDN, the proxy builds up a connection to the remote call control manager CC by evaluating the IPUI. The home address of the cordless terminal 10 can be derived from its IPUI.

The definition of the three scenarios is as follows:
Local scenario, standard ISDN:
known local call control
Local scenario, enhanced ISDN and remote:
For an outgoing call from the cordless terminal 10, a physical entity (not shown in detail) directly on the network side of the interface 31, in the proxy PRO for instance, is informed about the scenario SCEN and the IPUI of the terminal subscription to distinguish between local enhanced and remote, and to route the connection to the physical entity where the call control is located. For a call incoming to the cordless terminal 10, the physical entity where the call control is located may need to build a connection to the physical entity at the network side of the interface 31, and the physical entity directly on the network side of the interface 31 needs to pass extra information to a physical entity (not shown in detail) where the call control agent is located.

Figure 7:
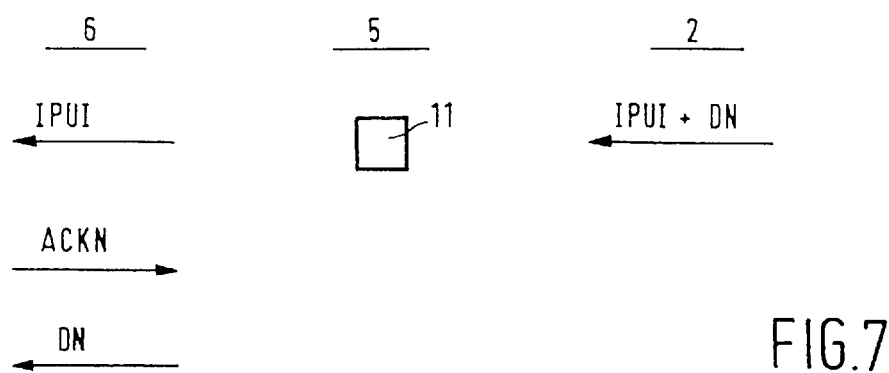
FIG. 7 shows an efficient call control setup procedure according to the invention.

FIG. 7 shows an efficient call control setup procedure according to the invention over the interface 31 in case of remote enhanced ISDN signalling when an intervening network is present. Shown is a single step procedure for setting up a connection to the home automatic branch exchange 6 and for providing user info such as a destination number to the home automatic branch exchange 6. The cordless access subsystem 2 sends a single message to the network 5 comprising an identification IPUI for finding the right home automatic branch exchange, and user information such as a destination number DN. The network 5 stores the destination number DN in the memory 11, and passes the identification information IPUI through the network 5. If the right home automatic branch exchange, here exchange 6, can detect the message and the cordless terminal 10 was authorized to make the call, it sends an acknowledgement message ACKN to the network 5. Then, the network 5 sends the user information DN to the home automatic branch exchange 6. Herewith, the interface 31 is simpler because of steps and because of reduced processing. In another embodiment, the destination number DN is not temporarily stored but all the user provided information is immediately passed to the home branch exchange 6 together with the identification information IPUI.

What is claimed is:

1. A telecommunications system comprising at least one cordless access subsystem, a cordless terminal, and an ISDN network of at least one automatic branch exchange, and further comprising call control means including a call control agent at the side of the cordless access subsystem and a call control manager at the side of the network, the call control agent being arranged to operate a call control protocol in which a call control setup message for an outgoing call from the cordless terminal is sent to the network by a call control agent transport entity, which call control setup message comprises an information element indicating to the network a call control scenario selected from local standard ISDN, local enhanced ISDN, and remote enhanced ISDN to be carried out depending on a subscription associated with the cordless terminal.

2. A telecommunications system comprising at least one cordless access subsystem, a cordless terminal, and a network of at least one automatic branch exchange, and further comprising call control means including a call control agent at the side of the cordless access subsystem and a call control manager at the side of the network, the call control agent being arranged to operate a call control protocol in which a call control setup message for an outgoing call from the cordless terminal is sent to the network by a call control agent transport entity, which call control setup message comprises an information element indicating to the network a call control scenario to be carried out depending on a subscription associated with the cordless terminal, and wherein the information element comprises a globally unique operation value to be interpreted by the call control manager so as to accept or reject the call control setup message, and operation parameters to be processed by the call control manager when it has not rejected the operation value.

3. A telecommunications system according to claim 2, wherein the network is an ISDN network and the call control scenario is selected from local standard ISDN, local enhanced ISDN, and remote enhanced ISDN.

4. A telecommunications system according to claim 3, wherein the network comprises a further automatic branch exchange, the at least one branch exchange and the further branch exchange being coupled to each other at remote locations by means of an intervening network, and wherein when the scenario is remote enhanced ISDN, the cordless terminal is locked to the at least one branch exchange, and the further branch exchange is a home branch exchange for the cordless terminal, the call control manager is located in the further branch exchange so as to remotely control the call from the cordless terminal.

5. A telecommunications system according to claim 4, wherein one of the operation parameters comprises a unique cordless terminal identification number from which the network derives routing of the call control setup message to the home branch exchange.

6. A telecommunications system according to claim 5, wherein the call control setup message comprises subscriber provided information including a call destination number and wherein the network is arranged to temporarily store the subscriber provided information, send the terminal identification number to the home branch exchange, and then, after having received acknowledgment from the home branch exchange that the cordless terminal is known in the home branch exchange, send the stored subscriber provided information to the home branch exchange.

7. A telecommunications system according to claim 5, wherein the call control setup message comprises subscriber provided information including a call destination number and wherein the network is arranged to immediately send the terminal identification number and the subscriber provided information to the home branch exchange.

8. A telecommunications system according to claim 1, wherein the network comprises a further automatic branch exchange, the at least one branch exchange and the further branch exchange being coupled to each other at remote locations by means of an intervening network, and wherein when the scenario is remote enhanced ISDN, the cordless terminal is locked to the at least one branch exchange, and the further branch exchange is a home branch exchange for the cordless terminal, the call control manager is located in the further branch exchange so as to remotely control the call from the cordless terminal.

9. A telecommunications system according to claim 8, wherein one of the operation parameters comprises a unique cordless terminal identification number from which the network derives routing of the call control setup message to the home branch exchange.

10. A telecommunications system according to claim 9, wherein the call control setup message comprises subscriber provided information including a call destination number and wherein the network is arranged to temporarily store the subscriber provided information, send the terminal identification number to the home branch exchange, and then, after having received acknowledgment from the home branch exchange that the cordless terminal is known in the home branch exchange, send the stored subscriber provided information to the home branch exchange.

11. A telecommunications system according to claim 9, wherein the call control setup message comprises subscriber provided information including a call destination number and wherein the network is arranged to immediately send the terminal identification number and the subscriber provided information to the home branch exchange.

12. A cordless access subsystem for use in a telecommunications system comprising a cordless terminal, an ISDN network of at least one automatic branch exchange, and a call control agent at the side of the cordless access subsystem, the call control agent being arranged to operate a call control protocol in which a call control setup message for an outgoing call from the cordless terminal is sent to the network by a call control agent transport entity, which call control setup message comprises an information element indicating to the network a call control scenario selected from local standard ISDN, local enhanced ISDN, and remote enhanced ISDN to be carried out depending on a subscription associated with the cordless terminal.

\* \* \* \* \*